(12) United States Patent
Wade et al.

(10) Patent No.: US 8,757,001 B2
(45) Date of Patent: Jun. 24, 2014

(54) MECHANICALLY COUPLED FORCE SENSOR ON FLEXIBLE PLATFORM ASSEMBLY STRUCTURE

(71) Applicant: Honeywell International Inc., Morristown, NJ (US)

(72) Inventors: Richard Wade, Worthington, OH (US); Ian Bentley, New Ipswich, NH (US); Mohammed Abdul Javvad Qasimi, Hilliard, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/628,673

(22) Filed: Sep. 27, 2012

(65) Prior Publication Data

US 2014/0083209 A1   Mar. 27, 2014

(51) Int. Cl.
*G01B 7/16* (2006.01)
*G01L 1/00* (2006.01)

(52) U.S. Cl.
USPC .............................................. 73/774; 73/777

(58) Field of Classification Search
USPC ................................... 73/774–777
See application file for complete search history.

(56) References Cited

U.S. PATENT DOCUMENTS

| | | | |
|---|---|---|---|
| 5,760,313 A * | 6/1998 | Guentner et al. | 73/862.584 |
| 6,401,545 B1 * | 6/2002 | Monk et al. | 73/756 |
| 7,360,438 B2 * | 4/2008 | Gaines | 73/774 |
| 7,523,672 B2 | 4/2009 | Lapstun et al. | |
| 7,726,197 B2 | 6/2010 | Selvan et al. | |
| 7,880,247 B2 * | 2/2011 | Vaganov et al. | 257/415 |
| 8,091,436 B2 | 1/2012 | Eckhardt et al. | |
| 8,327,715 B2 * | 12/2012 | Bradley et al. | 73/774 |
| 2005/0217386 A1 * | 10/2005 | Hirose et al. | 73/763 |
| 2007/0251328 A1 * | 11/2007 | Selvan et al. | 73/777 |
| 2008/0010821 A1 * | 1/2008 | Padmanabhan et al. | 29/842 |
| 2009/0078040 A1 * | 3/2009 | Ike et al. | 73/204.26 |
| 2009/0211365 A1 * | 8/2009 | Morikawa et al. | 73/775 |
| 2011/0000318 A1 | 1/2011 | Bradley et al. | |
| 2012/0152037 A1 * | 6/2012 | Wade | 73/862.627 |
| 2013/0247689 A1 * | 9/2013 | Thanigachalam et al. | 73/862.627 |
| 2013/0247690 A1 * | 9/2013 | Wade | 73/862.632 |

* cited by examiner

*Primary Examiner* — Lisa Caputo
*Assistant Examiner* — Jonathan Dunlap
(74) *Attorney, Agent, or Firm* — Ingrassia Fisher & Lorenz, P.C.

(57) ABSTRACT

A force sensor system includes a substrate, a cover, a sensor, and a spherical force transfer element. The cover is coupled to the substrate, and has an inner surface, an outer surface, an opening extending between the inner and outer surfaces, and a wall structure extending from the inner surface that defines a sensor cavity between the inner surface and the substrate. The sensor is mounted on the substrate, is disposed within the sensor cavity, and is configured to generate a sensor signal representative of a force supplied to the sensor. The spherical force transfer element is disposed partially within the sensor cavity, is movable relative to the cover, extends from the opening in the cover, and engages the sensor. The spherical force transfer element is adapted to receive an input force and is configured, upon receipt of the input force, to transfer the input force to the sensor.

12 Claims, 5 Drawing Sheets

MECHANICALLY COUPLED FORCE SENSOR ON FLEXIBLE PLATFORM ASSEMBLY STRUCTURE

TECHNICAL FIELD

The present invention generally relates to force sensors, and more particularly relates to a mechanically coupled force sensor implemented on a relatively flexible platform assembly structure.

BACKGROUND

Force sensors are used in myriad systems and environments. End-users of force sensors are demanding greater performance and smaller packaging. In particular, many end-users are demanding force sensors with a Total Error Band of around 1% over a specified temperature range. In addition to increased performance, sensor cost is also a big driver. The markets of some end-users exhibit relatively stringent cost pressures. Historically, force sensor suppliers have addressed these demands via two separate options. One option is to provide an uncompensated/unamplified force sensor, which can be manufactured into a relatively small package. The second option is to provide an amplified/compensated force sensor. These latter sensors, however, are manufactured into relatively large packages. One reason for this is that a mechanically-coupled, amplified solution that can be practically and economically calibrated has not yet been developed.

Hence, there is a need for a force sensor system that exhibits relatively good performance in relatively small packaging, and that can be practically and economically calibrated. The present invention addresses at least these needs.

BRIEF SUMMARY

In one embodiment, a force sensor system includes a substrate, a cover, a sensor, and a spherical force transfer element. The cover is coupled to the substrate, and has an inner surface, an outer surface, and an opening extending between the inner and outer surfaces. A wall structure extends from the inner surface that defines a sensor cavity between the inner surface and the substrate. The sensor is mounted on the substrate and is disposed within the sensor cavity. The sensor is configured to generate a sensor signal representative of a force supplied to the sensor. The spherical force transfer element is disposed partially within the sensor cavity and is movable relative to the cover. The spherical force transfer element extends from the opening in the cover and engages the sensor. The spherical force transfer element is adapted to receive an input force and is configured, upon receipt of the input force, to transfer the input force to the sensor.

In another embodiment, a force sensor system includes a substrate, a cover, a sensor, a processor, a load bearing element, and a force transfer element. The substrate includes a first side and a second side. The cover is coupled to the first side of the substrate, and has an inner surface, an outer surface, and an opening extending between the inner and outer surfaces. A wall structure extends from the inner surface that defines a sensor cavity and a processor cavity between the inner surface and the substrate. The sensor is mounted on the first side of the substrate and is disposed within the sensor cavity. The sensor is configured to generate a sensor signal representative of a force supplied to the sensor. The processor is mounted on the first side of the substrate and is disposed within the processor cavity. The processor is coupled to receive the sensor signal and is configured, upon receipt thereof, to supply a force sensor output signal. The load bearing element is coupled to the second side of the substrate and is configured to limit force transferred to the substrate. The force transfer element is disposed partially within sensor cavity and is movable relative to the cover. The force transfer element extends from the opening in the cover and engages the sensor. The force transfer element is adapted to receive an input force and is configured, upon receipt of the input force, to transfer the input force to the sensor.

In yet another embodiment, a force sensor system includes a substrate, a cover, a sensor, a load bearing element, and a force transfer element. The substrate includes a first side, a second side, and a plurality of cover alignment openings formed in the first side. The cover is coupled to the first side of the substrate, and has an inner surface, an outer surface, and an opening extending between the inner and outer surfaces. A wall structure extends from the inner surface that defines a sensor cavity between the inner surface and the substrate. The cover also includes plurality of cover alignment pins, each of which is disposed within one of the cover alignment openings. The sensor is mounted on the first side of the substrate and is disposed within the sensor cavity. The sensor is configured to generate a sensor signal representative of a force supplied to the sensor. The load bearing element is coupled to the second side of the substrate and is configured to limit force transferred to the substrate. The force transfer element is disposed partially within the sensor cavity and is movable relative to the cover. The force transfer element extends from the opening in the cover and engages the sensor. The force transfer element is adapted to receive an input force and is configured, upon receipt of the input force, to transfer the input force to the sensor.

Furthermore, other desirable features and characteristics of the force sensor system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
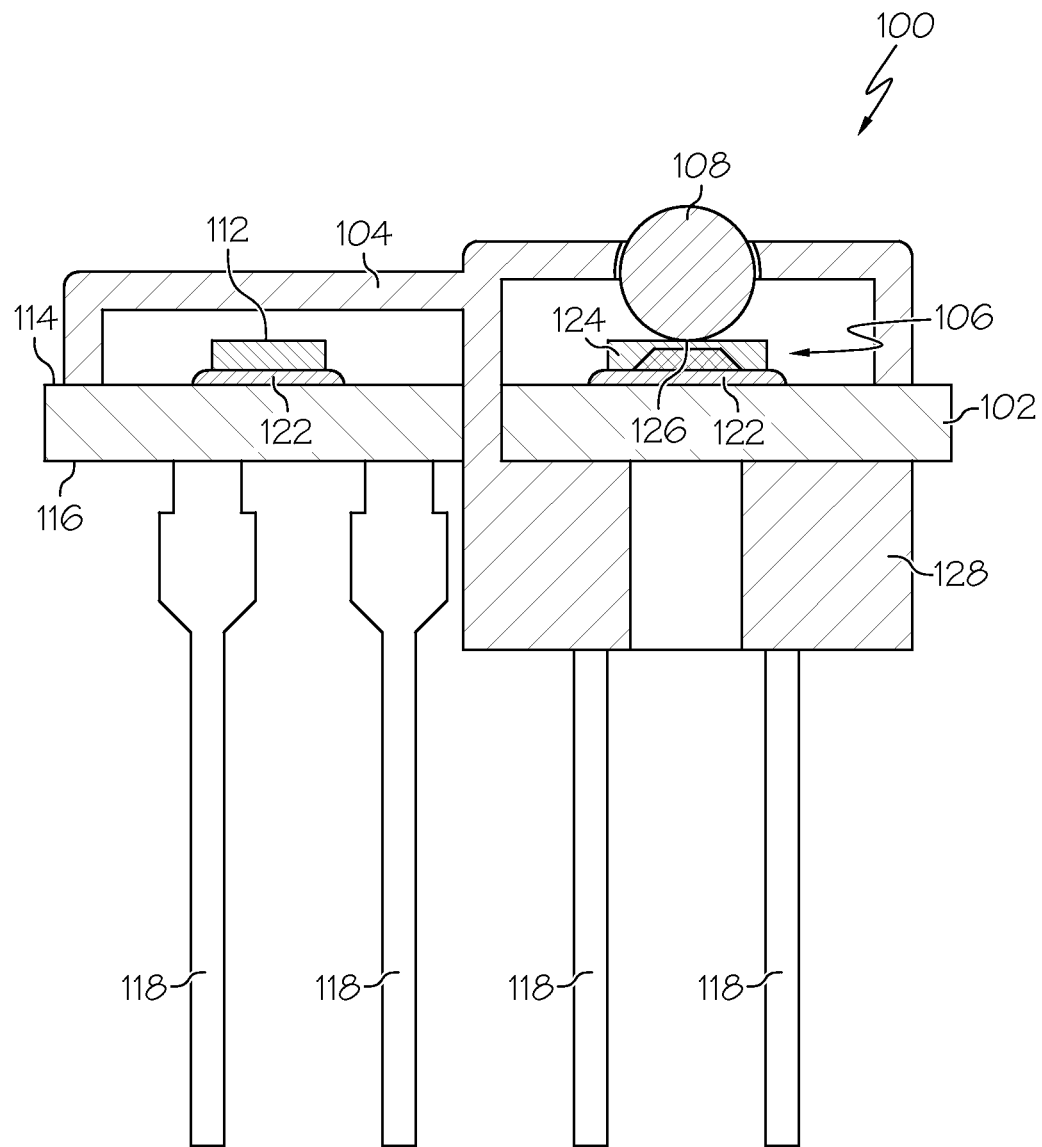
FIG. 1 depicts a cross section view of one embodiment of a force sensor system.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An embodiment of a force sensor system 100 is depicted in FIGS. 1-4, and includes a substrate 102, a cover, 104, a sensor 106, a force transfer element 108, and a processor 112. The substrate 102 includes a first side 114 and a second side 116, and may be formed of any one of numerous materials, such as, for example, ceramic. No matter the material of construction, the substrate 102 additionally includes a plurality of output connector pins 118, which may be used to connect the force sensor system 100 to an external device or system. The substrate 102 may also have suitable circuit traces, or other suitable means, for electrically coupling the sensor 106 and processor 108 to each other and to the output connector pins 118. Although the depicted substrate 102 is configured as a dual in-line package (DIP), this is merely exemplary. In alternative embodiments the substrate 102 could be configured as a single in-line package (SIP) or as a surface mount technology (SMT) device.

Figure 2:
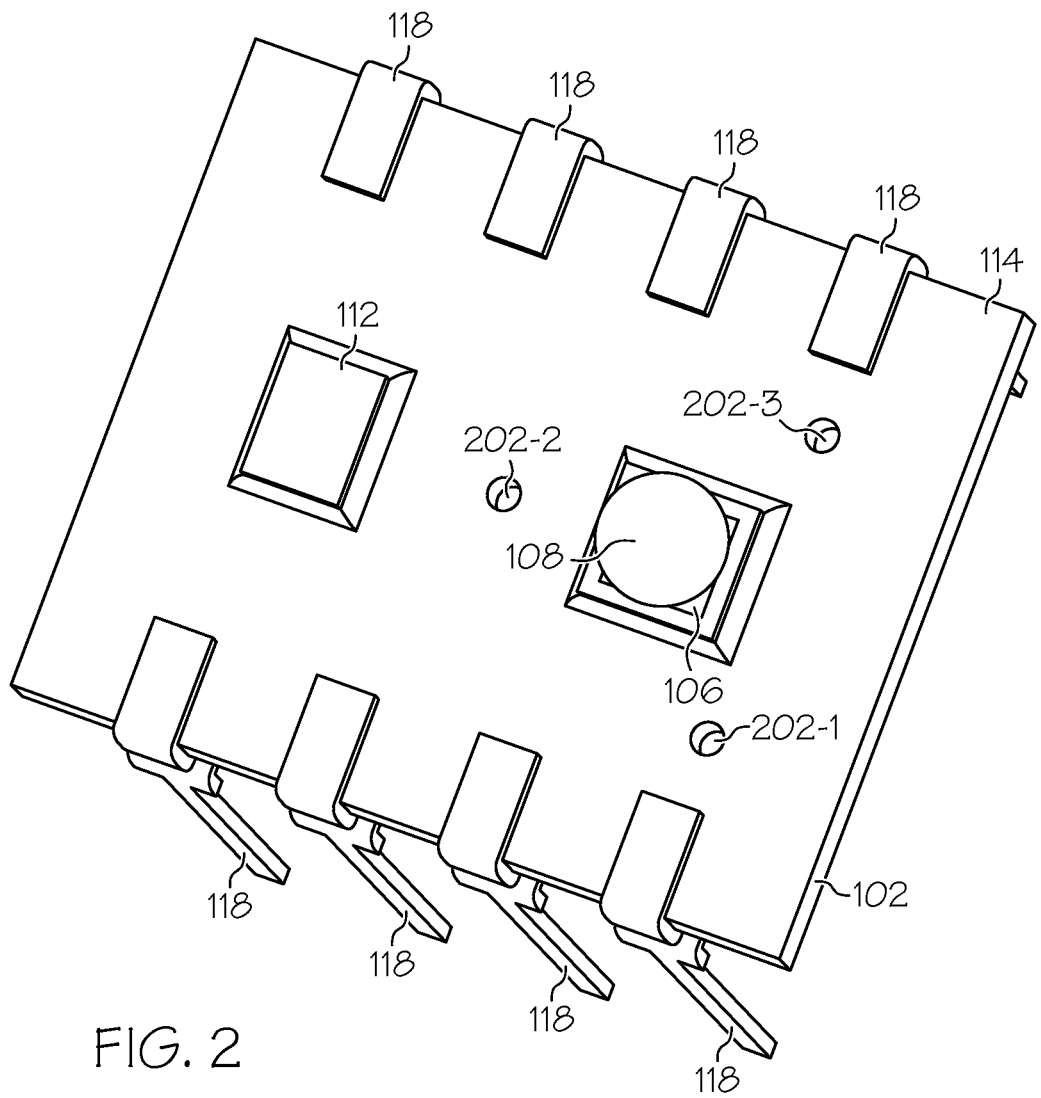
FIG. 2 depicts a plan view of the force sensor system of FIG. 1 with the cover removed.
Figure 3:
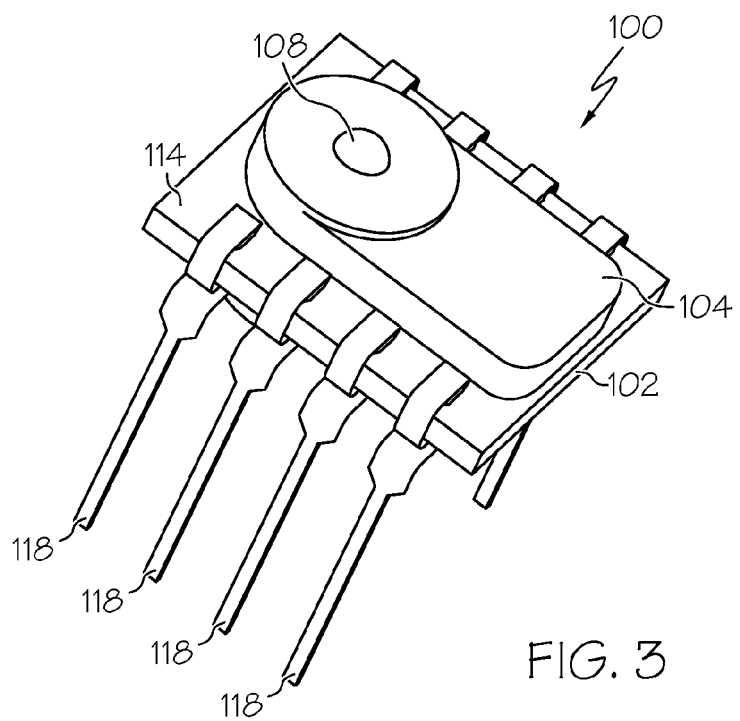
FIGS. 3 and 4 depict plan views of the force sensor system of FIG. 1.

As depicted most clearly in FIG. 2, the substrate additionally includes a plurality of cover alignment openings 202 (202-1, 202-2, 202-3). Although the depicted embodiment includes three cover alignment openings 202, it will be appreciated that the substrate 102 could be implemented with more or less than this number. The cover alignment openings 202 may extend partially or completely through the substrate 102, and are configured to receive cover alignment pins 602 (602-1, 602-2, 602-3) (see FIG. 6) that are formed on the cover 104. As with the cover alignment openings 202, although the depicted embodiment includes three cover alignment pins 602, it will be appreciated that the cover 104 could be implemented with more or less than this number.

Figure 5:
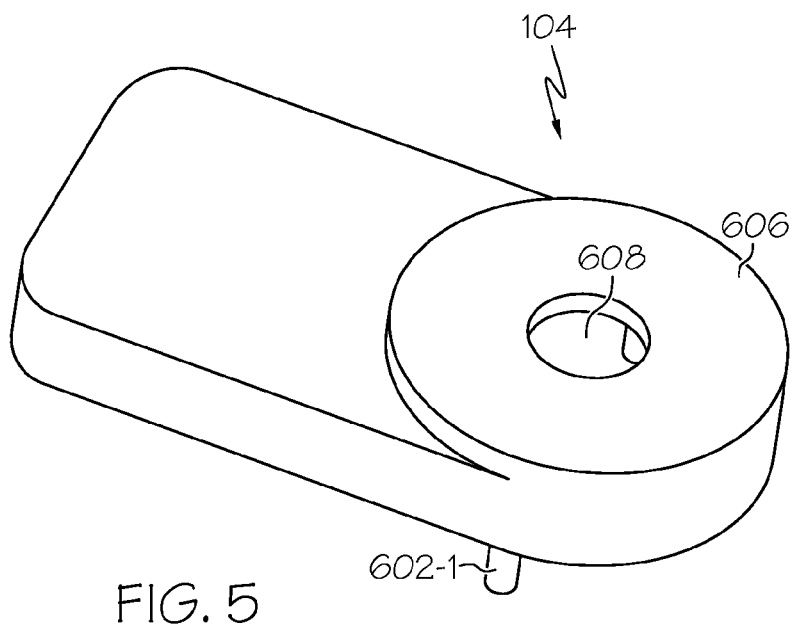
FIGS. 5 and 6 depict plan views of one embodiment of the cover that is used to implement the force sensor system of FIGS. 1, 3, and 4.
Figure 6:
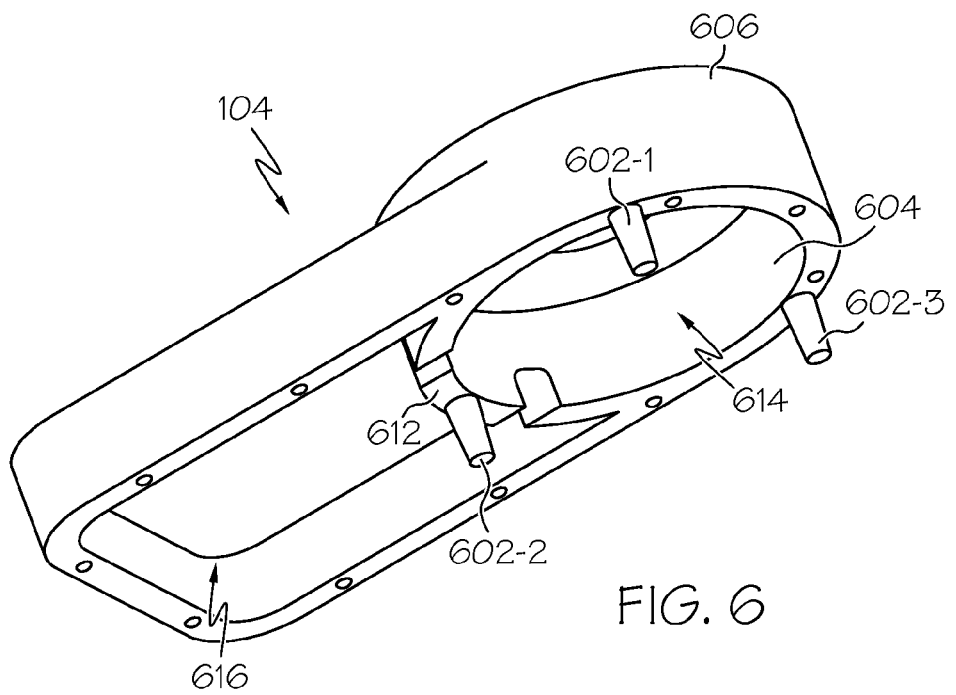

The cover 104, plan views of which are depicted in FIGS. 5 and 6, is coupled to the substrate 102, and has an inner surface 604, an outer surface 606, an opening 608, and a wall structure 612. The opening 608 extends between the inner and outer surfaces 604, 606. The wall structure 612 extends from the inner surface 604 and, as best illustrated in FIG. 1, defines two cavities—a sensor cavity 614 and a processor cavity 616—between the inner surface 604 and the substrate 102. In the depicted embodiment, the sensor cavity 614 is generally cylindrical-shaped, and its height is greater than that of the processor cavity 616, which is generally rectangular-shaped. These shapes and relative heights may, if need or desired, vary from the depicted embodiment. Moreover, in some embodiments, the cover 104 may be implemented without the processor cavity 616.

Before proceeding further it is noted that because the cover 104 is a separate element, rather than an integrated element as in some sensor systems, the specific configuration of the cover 104 may be changed at a relatively low cost, if needed or desired, since only the cover 104 configuration would change. The remainder of the force sensor system 100 would, however, not be affected. This provides the advantage of keeping change-over costs relatively low, while still being implemented relatively fast and easy.

With continued reference to FIG. 1, it may be seen that the sensor 106 is mounted on the substrate 102 and is disposed within the sensor cavity 614. The sensor 106 may be mounted on the substrate 102 via solder or other suitable means, but is preferably mounted thereon via an adhesive 122. The depicted sensor 106 includes a mount portion 124 and a diaphragm 126. The mount portion 124 is used to mount the sensor 106 to the substrate 102. The diaphragm 126 is formed in the mount portion 124, and has one or more sensing elements formed thereon that sense deflections of the diaphragm 126. The sensing elements may be piezoresistors, strain gages, or any one of numerous other known devices. No matter its specific implementation, the sensor 106 is configured to generate a sensor signal representative of a force supplied thereto.

The force transfer element 108 may be variously configured and implemented, but in the depicted embodiment it is spherical in shape. The force transfer element 108 is disposed partially within sensor cavity 614 and is movable relative to the cover 104. More specifically, the force transfer element 108 extends from the opening 608 in the cover 104 and engages the sensor 106, and more particularly the diaphragm 126. The force transfer element 108 is adapted to receive an input force and is configured, upon receipt of the input force, to transfer the input force to the sensor 106.

It was previously noted that the substrate 102 includes a plurality of cover alignment openings 202 and that the cover 104 includes a plurality of cover alignment pins 602. The cover alignment openings 202 and the cover alignment pins 602 are disposed to provide proper alignment of the force transfer element 108 to the sensor 106. It will be appreciated that the force transfer element 108 may be installed before the cover 104 is coupled to the substrate 102, or it may be press fit into the opening 608 after the cover 104 is coupled to the substrate 102.

The processor 112 is mounted on the substrate 102 and disposed within the processor cavity 616. The processor 112, similar to the sensor 106, may be mounted on the substrate 102 via solder or other suitable means, but is also preferably mounted thereon via an adhesive 122. The processor 112 may be implemented as an application specific integrated circuit (ASIC), as a microprocessor, or as a microcontroller, just to name a few. In any case, the processor 112 is coupled to receive the sensor signal supplied by the sensor 106 and is configured, upon receipt thereof, to supply a force sensor output signal.

Figure 4:
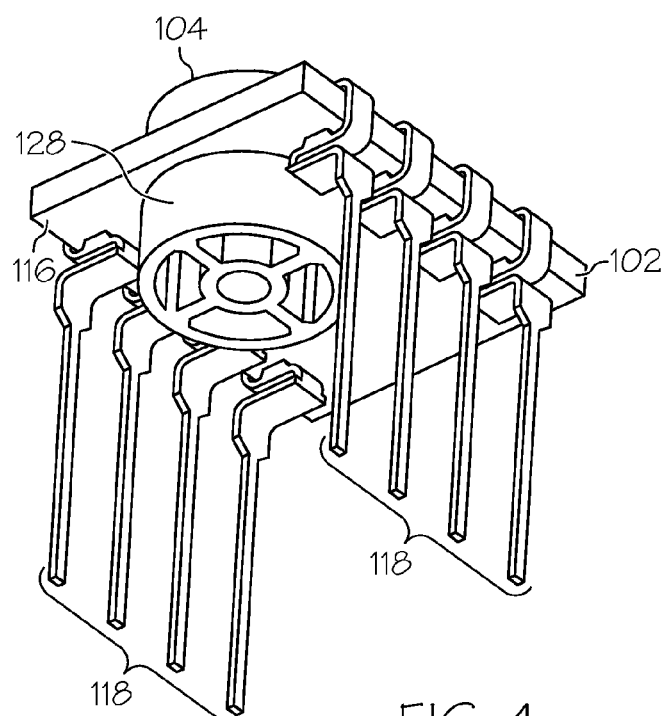

As depicted most clearly in FIGS. 1 and 4, the force sensor system 100 may additionally include a load bearing element 128. The load bearing element 128, if included, is coupled to the second side 116 of the substrate 102 and is configured to limit any force that may be transferred to the substrate 102. In particular, when the force sensor system 100 is connected to a non-illustrated external system or device, the load bearing element 128 will concentrate the load from the force being applied to the force sensor system 100 into the external system or device. This will prevent, or at least significantly reduce the likelihood, of overloading, and potentially breaking, the substrate 102 or damaging the terminals.

Figure 7:
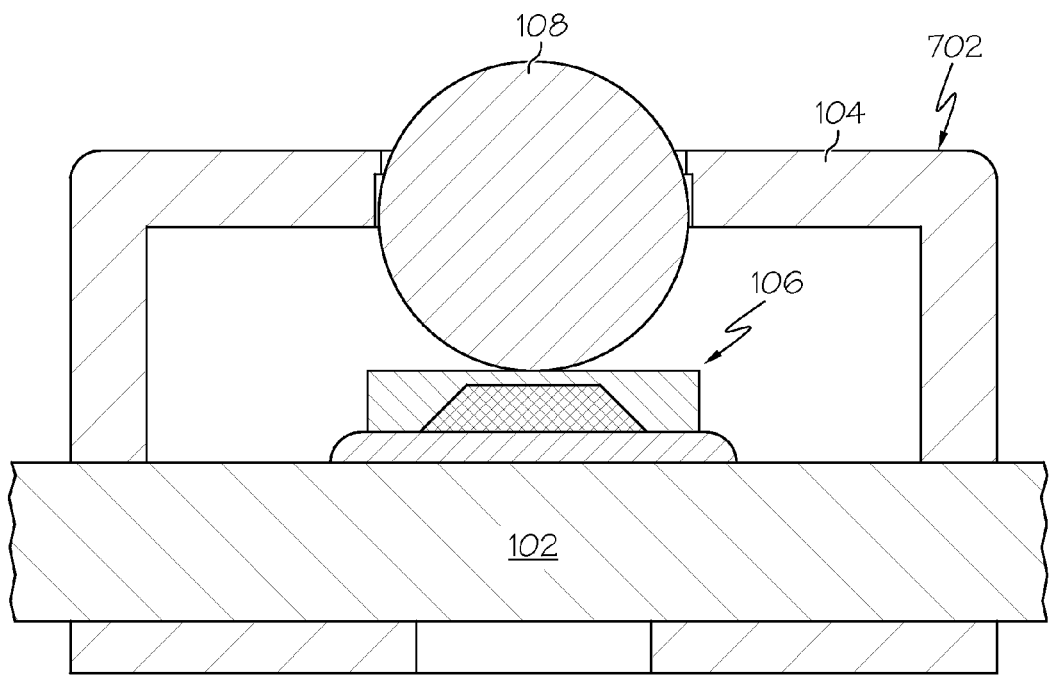
FIG. 7 is a close-up cross section view of a portion of the force sensor system of FIGS. 1, 3, and 4.

Referring now to FIG. 7, in the depicted embodiment the outer surface of the cover 104, and more particularly the outer surface of the cover 104 that is disposed over the sensor cavity 614, is configured to comprise a seal surface 702. The seal surface 702 is adapted to receive a calibration pressure source (not illustrated), which allows the force sensor system 100 to be calibrated. More specifically, the calibration pressure source can be used to actuate the sensor 106 over various temperatures. Thereafter, the offset and span can be checked and confirmed at room temperature. It was noted above that the force transfer element 108 may be installed before the cover 104 is coupled to the substrate 102, or it may be press fit into the opening 608 after the cover 104 is coupled to the substrate 102. In this regard, it is noted that the force transfer element 108 may be press fit into the opening 608 after the force sensor system 100 is calibrated.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A force sensor system, comprising:
   a substrate including a first side and a second side;
   a cover coupled to the first side of the substrate, the cover having an inner surface, an outer surface, an opening extending between the inner and outer surfaces, and a wall structure extending from the inner surface that defines a sensor cavity and a processor cavity between the inner surface and the substrate;
   a sensor mounted on the first side of the substrate and disposed within the sensor cavity, the sensor configured to generate a sensor signal representative of a force supplied to the sensor;
   a processor mounted on the first side of the substrate and disposed within the processor cavity, the processor coupled to receive the sensor signal and configured, upon receipt thereof, to supply a force sensor output signal;
   a load bearing element coupled to the second side of the substrate and configured to limit force transferred to the substrate; and
   a force transfer element disposed partially within sensor cavity and movable relative to the cover, the force transfer element extending from the opening in the cover and engaging the sensor, the force transfer element adapted to receive an input force and configured, upon receipt of the input force, to transfer the input force to the sensor.

2. The force sensor system of claim 1, further comprising an adhesive disposed between the substrate and the sensor to adhere the sensor to the substrate, and between the substrate and the processor to adhere the processor to the substrate.

3. The force sensor system of claim 1, wherein the force transfer element comprises a spherical force transfer element.

4. The force sensor system of claim 1, wherein the outer surface of the cover comprises a seal surface, the seal surface adapted to receive a calibration pressure source.

5. The force sensor system of claim 1, wherein:
   the substrate includes a plurality of cover alignment openings; and the cover includes a plurality of cover alignment pins, each cover alignment pin disposed within one of the cover alignment openings.

6. The force sensor system of claim 1, wherein the cover alignment openings and the cover alignment pins are disposed to provide proper alignment of the force transfer element to the sensor.

7. A force sensor system, comprising:
a substrate including a first side, a second side, and a plurality of cover alignment openings formed in the first side;
a cover coupled to the first side of the substrate, the cover having an inner surface, an outer surface, an opening extending between the inner and outer surfaces, a wall structure extending from the inner surface that defines a sensor cavity between the inner surface and the substrate, and a plurality of cover alignment pins, each cover alignment pin disposed within one of the cover alignment openings;
a sensor mounted on the first side of the substrate and disposed within the sensor cavity, the sensor configured to generate a sensor signal representative of a force supplied to the sensor;
a load bearing element coupled to the second side of the substrate and configured to limit force transferred to the substrate; and
a force transfer element disposed partially within sensor cavity and movable relative to the cover, the force transfer element extending from the opening in the cover and engaging the sensor, the force transfer element adapted to receive an input force and configured, upon receipt of the input force, to transfer the input force to the sensor.

8. The force sensor system of claim 7, wherein:
the wall structure further defines a processor cavity between the inner surface and the substrate; and
the force sensor system further comprises a processor mounted on the substrate and disposed within the processor cavity, the processor coupled to receive the sensor signal and configured, upon receipt thereof, to supply a force sensor output signal.

9. The force sensor system of claim 8, wherein the force transfer element comprises a spherical force transfer element.

10. The force sensor system of claim 7, further comprising:
an adhesive disposed between the substrate and the sensor to adhere the sensor to the substrate, and between the substrate and the processor to adhere the processor to the substrate.

11. The force sensor system of claim 7, wherein the outer surface of the cover comprises a seal surface, the seal surface adapted to receive a calibration pressure source.

12. The force sensor system of claim 7, wherein the cover alignment openings and the cover alignment pins are disposed to provide proper alignment of the force transfer element to the sensor.

* * * * *